US012802119B2

(12) United States Patent
Scheibelhut et al.

(10) Patent No.: US 12,802,119 B2
(45) Date of Patent: Nov. 17, 2026

(54) CREATING PERSONALIZED ONLINE ORDERS USING A VOICE AUGMENTED LANGUAGE MODEL

(71) Applicant: Maplebear Inc., San Francisco, CA (US)

(72) Inventors: Brent Scheibelhut, Toronto (CA); Maxwell Mullen, San Francisco, CA (US); Naval Shah, Toronto (CA)

(73) Assignee: Maplebear Inc., San Francisco, CA (US)

( * ) Notice: Subject to any disclaimer, the term of this patent is extended or adjusted under 35 U.S.C. 154(b) by 47 days.

(21) Appl. No.: 18/979,348

(22) Filed: Dec. 12, 2024

(65) Prior Publication Data

US 2026/0170549 A1 Jun. 18, 2026

(51) Int. Cl.
*G06Q 30/00* (2023.01)
*G06Q 30/0601* (2023.01)
(Continued)

(52) U.S. Cl.
CPC ..... *G06Q 30/0635* (2013.01); *G06Q 30/0641* (2013.01); *G10L 15/063* (2013.01); (Continued)

(58) Field of Classification Search
CPC ............ G06Q 30/0635; G06Q 30/0641; G10L 15/063
See application file for complete search history.

(56) References Cited

U.S. PATENT DOCUMENTS

2008/0189187 A1* 8/2008 Hao .................... G06Q 30/0633 705/26.8
2013/0268331 A1* 10/2013 Bitz .................... G06Q 30/0631 705/26.7

(Continued)

OTHER PUBLICATIONS

R. Jampala, D. S. Kola, A. N. Gummadi, M. Bhavanam and I. Rani Pannerselvam, "The Evolution of Voice Assistants: From Text-to-Speech to Conversational AI," 2024 2nd International Conference on Intelligent Data Communication Technologies and IoT (IDCIoT), Bengaluru, India, 2024, pp. 1332-1338. (Year: 2024).*

(Continued)

*Primary Examiner* — Anand Loharikar
(74) *Attorney, Agent, or Firm* — Fenwick & West LLP

(57) ABSTRACT

An online system uses a voice augmented language model to create a personalized online order using voice commands from a user of the online system. The online system generates a prompt for input into the language model, the prompt including user's voice content, user's sentiment data, other user data, and source data. The language model uses the prompt to generate a list of components and metadata for each component. Upon receiving an acknowledgement signal indicating an acknowledgement of the list of components by the user, the online system converts the list of components into a list of items and generates one or more options for servicing an order including the list of items. The online system then generates a user interface signal that causes a device associated with the user to display a user interface with the list of items and the one or more options for servicing the order.

20 Claims, 5 Drawing Sheets

(51) Int. Cl.
*G10L 15/06* (2013.01)
*G10L 15/18* (2013.01)
*G10L 15/183* (2013.01)
*G10L 15/22* (2006.01)
*G10L 15/30* (2013.01)
*G10L 15/32* (2013.01)

(52) U.S. Cl.
CPC ........ *G10L 15/1815* (2013.01); *G10L 15/183* (2013.01); *G10L 15/22* (2013.01); *G10L 15/30* (2013.01); *G10L 15/32* (2013.01)

(56) References Cited

U.S. PATENT DOCUMENTS

2014/0064267 A1 3/2014 Thi et al.
2019/0281030 A1 9/2019 Isaacson et al.
2020/0311804 A1* 10/2020 Buckholdt ......... G06Q 30/0641
2023/0214592 A1* 7/2023 Kedia .................. G06N 3/0442
704/9
2025/0232134 A1* 7/2025 Shekhar ................ G06F 40/295

OTHER PUBLICATIONS

PCT International Search Report and Written Opinion, PCT Application No. PCT/US2025/049017, Dec. 18, 2025, 12 pages.

* cited by examiner

CREATING PERSONALIZED ONLINE ORDERS USING A VOICE AUGMENTED LANGUAGE MODEL

BACKGROUND

An online system enables users to place online orders so that the users of the online system can perform online purchases of various items (e.g., groceries) offered by various sources (e.g., retailers). In this context, it is desirable to enable users of the online system to create orders from voice prompts. For example, creating orders may include creating lists of items, selecting a source from which to obtain the items, and selecting a delivery time window or other delivery options. However, there remains a technical problem of how to enable users of the online system to create personalized orders from voice prompts.

SUMMARY

One or more embodiments are directed to using a voice augmented language model to create personalized orders for servicing by an online system. In accordance with one or more aspects of the disclosure, the online system receives, via a network from a device associated with a user of the online system, a voice input. The online system generates, using the voice input, voice content in a textual form. The online system extracts, from the voice input, sentiment data for the user. The online system generates a prompt for input into a language model (e.g., large language model), the prompt including the voice content, the sentiment data, one or more signals related to the user, and a request for generating a response that includes a list of components and metadata for each component in the list of components. The online system requests the language model to generate, based on the prompt input into the language model, the response that includes the list of components and the metadata for each component. The online system generates, using the list of components and the metadata for each component, a first user interface signal. The online system sends, via the network, the first user interface signal to the device associated with the user, wherein the sending the first user interface signal causes the device associated with the user to display a user interface with the list of components and the metadata for each component. The online system receives, from the device associated with the user and via the network, an acknowledgement signal indicating an acknowledgement of the list of components by the user. Responsive to receiving the acknowledgement signal, the online system converts, based at least in part on information about items in a database of the online system and the metadata for each component, the list of components into a list of items for conversion by the user. The online system generates, based at least in part on information about the user and information about the list of items, one or more options for servicing an order including the list of items. The online system generates, using the list of items and the one or more options for servicing the order, a second user interface signal. The online system sends, via the network, the second user interface signal to the device associated with the user, wherein the sending the second user interface signal causes the device associated with the user to display the user interface with the list of items and the one or more options for servicing the order.

DETAILED DESCRIPTION

Figure 1A:
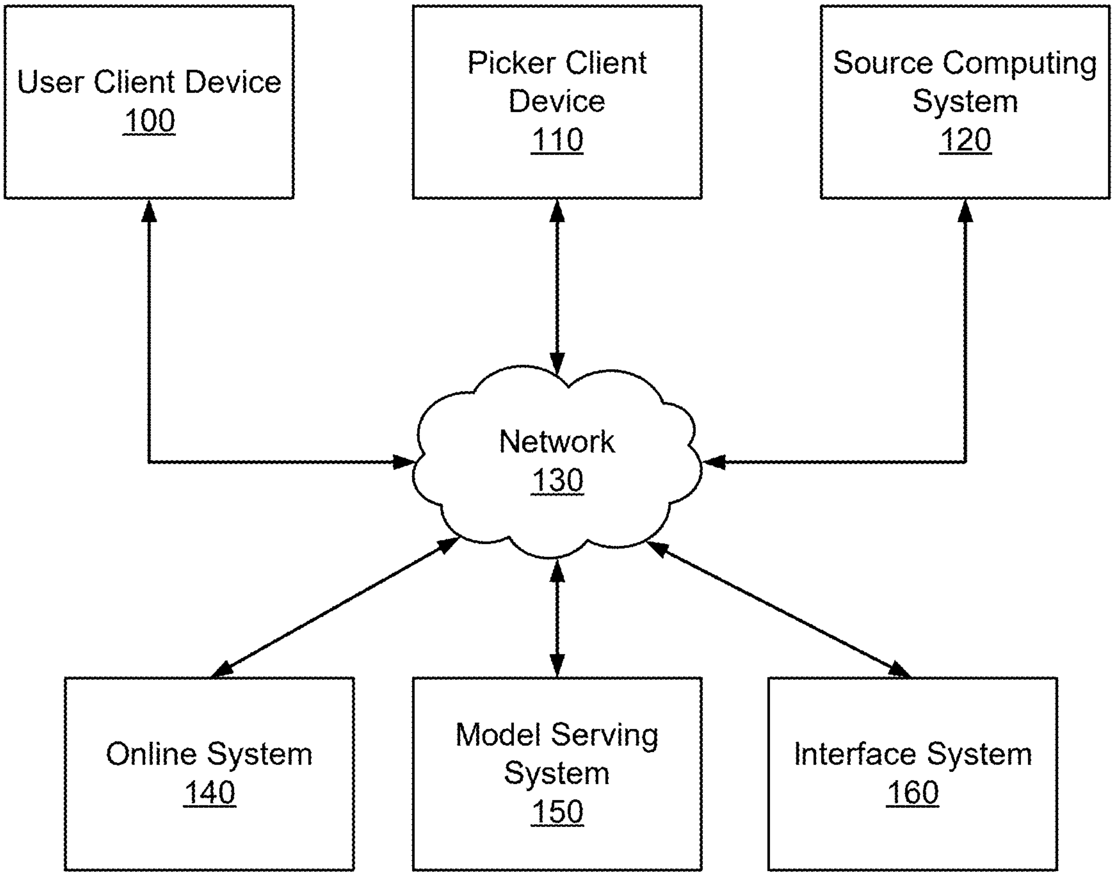
FIG. 1A illustrates an example system environment for an online system, in accordance with one or more embodiments.

FIG. 1A illustrates an example system environment for an online system 140, in accordance with one or more embodiments. The system environment illustrated in FIG. 1A includes a user client device 100, a picker client device 110, a source computing system 120, a network 130, an online system 140, a model serving system 150, and an interface system 160. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

Although one user client device 100, picker client device 110, and source computing system 120 are illustrated in FIG. 1A, any number of users, pickers, and sources may interact with the online system 140. As such, there may be more than one user client device 100, picker client device 110, or source computing system 120.

The user client device 100 is a client device through which a user may interact with the picker client device 110, the source computing system 120, or the online system 140. The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, means a good or product that can be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more sources from which the ordered items should be collected.

The user client device 100 presents an ordering interface to the user. The ordering interface is a user interface that the user can use to place an order with the online system 140. The ordering interface may be part of a client application operating on the user client device 100. The ordering interface allows the user to search for items that are available through the online system 140 and the user can select which items to add to an "ordering list." An "ordering list," as used herein, is a tentative set of items that the user has selected for an order but that has not yet been finalized for an order. The ordering list may alternatively be referred to as a "cart" or "shopping cart." The ordering interface allows a user to update the ordering list, e.g., by changing the quantity of items, adding or removing items, or adding instructions for items that specify how the item should be collected.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the source computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a source. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same source location. The collection interface further presents instructions that the user may have included related to the collection of items in the order. Additionally, the collection interface may present a location of each item at the source, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all the items for an order. The picker client device 110 may include a barcode scanner that can decode an item identifier encoded in a machine-readable label (e.g., a barcode or a QR code) coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and identifies the item identifier for the item based on the images. The picker client device 110 may determine the item identifier directly or by transmitting the images to the online system 140. Furthermore, the picker client device 110 determines weights for items that are priced by weight. The picker client device 110 may prompt the picker to manually input the weight of an item or may communicate with a weighing system in the source location to receive the weight of an item.

When the picker has collected the items for an order, the picker client device 110 instructs a picker on where to deliver the items for a user's order. For example, the picker client device 110 displays a delivery location from the order to the picker. The picker client device 110 also provides navigation instructions for the picker to travel from the source location to the delivery location. When a picker is servicing more than one order, the picker client device 110 identifies which items should be delivered to which delivery location. The picker client device 110 may provide navigation instructions from the source location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In some embodiments, the picker is a single person who collects items for an order from a source location and delivers the order to the delivery location for the order. Alternatively, more than one person may serve the role of a picker for an order. For example, multiple people may collect the items at the source location for a single order. Similarly, the person who delivers an order to its delivery location may be different from the person or people who collected the items from the source location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a source location for an order and an autonomous vehicle may deliver an order to a user from a source location.

In one or more embodiments, the online system 140 communicates with a smart shopping cart being used by a user to collect items in a source location. For example, the smart shopping cart may display content received from the online system 140 and may receive data describing items that are collected by the user and stored in a storage area of the shopping cart. In some embodiments, the smart shopping cart is a picker client device 110 being operated by a picker collecting items within a source location. Similarly, the smart shopping cart may be operated by a user within the source location collecting items for themselves. Example embodiments of smart shopping carts are described in U.S. patent application Ser. No. 18/630,672, entitled "Automated Identification of Items Placed in a Cart and Recommendations based on Same," filed Apr. 9, 2024, which is hereby incorporated by reference in its entirety.

The source computing system 120 is a computing system operated by a source that interacts with the online system 140. As used herein, a "source" is an entity that operates a "source location," which is a store, warehouse, or any other source from which a picker can collect items. The source computing system 120 stores and provides item data to the online system 140 and may regularly update the online system 140 with updated item data. For example, the source computing system 120 provides item data indicating which items are available at a particular source location and the quantities of those items. Additionally, the source computing system 120 may transmit updated item data to the online system 140 when an item is no longer available at the source location. Additionally, the source computing system 120 may provide the online system 140 with updated item prices, sales, or availabilities. Additionally, the source computing system 120 may receive payment information from the online system 140 for orders serviced by the online system 140. Alternatively, the source computing system 120 may provide payment to the online system 140 for some portion of the overall cost of a user's order (e.g., as a commission).

The user client device 100, the picker client device 110, the source computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of the standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a picker from a source. The online system 140 receives orders from a user client device 100 through the network 130. The online system 140 selects a picker to service the user's order and transmits the order to a picker client device 110 associated with the picker. If the picker accepts the order, the picker collects the ordered items from a source location and delivers the ordered items to the user. The online system 140 may charge a user for the order and provide portions of the payment from the user to the picker and the source.

As an example, the online system 140 may allow a user to order groceries from a grocery store source. The user's order may specify which groceries they want to be delivered from the grocery store and the quantities of each of the groceries. The user client device 100 transmits the user's order to the online system 140 and the online system 140 selects a picker to travel to the grocery store source location to collect the groceries ordered by the user. The online system transmits an offer to the picker for the picker to service the order in exchange for consideration and, if the picker accepts the offer, the picker collects the groceries from the grocery store. Once the picker has collected the groceries ordered by the user, the picker delivers the groceries to a location transmitted to the picker client device 110 by the online system 140.

The online system 140 enables users to create online orders using voice commands. When a user starts to build an order at the online system 140, the user may start to provide voice inputs. For each voice input, the online system 140 prompts a Large Language Model (LLM) with the voice content and other contextual information about the user (e.g., extracted user's sentiment), as well as source related features (e.g., item catalog information, item availability, etc.). The online system 140 then modifies the order and shows the results to the user, who may then follow up with subsequent voice commands to modify the order further. Hence, the LLM may take voice inputs from the user and generate several candidate orders to propose to the user. When the user confirms the order, the online system 140 may use another LLM to suggest fulfillment options for the order, such as the source and delivery options.

In this manner, the online system 140 allows for generating a list of items for conversion by the user from voice prompts, while aiming to create the user's preferred combination of the list of items in an order, a source for servicing the order, time window for delivering the order, and options for conversion on the list of items. The online system 140 presented herein can automatically garner user's intent and emotions from the voice prompts and implore the user for additional feedback as necessary to gain enough metadata to generate the user's preferred order selection.

The model serving system 150 receives requests from the online system 140 to perform tasks using machine-learning models. The tasks include, but are not limited to, natural language processing (NLP) tasks, audio processing tasks, image processing tasks, video processing tasks, and the like. In one or more embodiments, the machine-learning models deployed by the model serving system 150 are language models configured to perform one or more NLP tasks. The NLP tasks include, but are not limited to, text generation, query processing, machine translation, chatbots, and the like. In one or more embodiments, a language model of the model serving system 150 is configured as a transformer neural network architecture (i.e., a transformer model). Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learning model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learning model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online system 140 or one or more entities different from the online system 140. An LLM may be trained on a large amount of data from various data sources. For example, the data sources include websites, articles, posts on the web, and the like. From this massive amount of data coupled with the computing power of LLM, the LLM is able to perform various tasks and synthesize and formulate output responses based on information extracted from the training data.

In one or more embodiments, when the machine-learning model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In one or more other embodiments, the transformer architecture may have an encoder-decoder architecture and includes a set of encoders coupled to a set of decoders. An encoder or decoder may include one or more attention operations.

While a LLM with a transformer-based architecture is described in one or more embodiments, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

The online system 140 may employ an LLM of the model serving system 150 to generate a list of ingredients (or components) and metadata for each ingredient in the list. The online system 140 may prepare (e.g., via a prompt generation module 260 in FIG. 2) a prompt for input to the LLM. The prompt may include voice content provided by a user of the online system 140, user's contextual information, and source related features. The prompt may further include a request for the LLM to generate the list of ingredients and metadata for each ingredient in the list.

The LLM may generate a response to the prompt based on execution of the machine-learning model using the prompt. The response may include the list of ingredients and metadata for each ingredient on the list. The online system 140 may import the response from the model serving system 150 and use the response to generate an order for fulfillment.

In one example, when a user of the online system 140 asks "I want higher quality Parmesan cheese", the LLM can leverage the past purchase data of the user, store quality data based on feedback/chats from users and/or pickers, user's brand preferences, user's sentiment data, and real time data (e.g., stock availability for a specific delivery time window) to add a user's preferred ingredient (e.g., Parmesan cheese) to a list of ingredients. Additionally, the LLM may generate metadata around each ingredient in the list, including brand, size, and form factor-all of which factors in the likelihood an actual item will be picked for a particular source and delivery time window combination. The metadata may be built on specific factors (e.g., "product state"), which could be added on top of specific produce ingredients (e.g., bananas). Alternatively, the LLM may leverage the specific factors backwards to pick the right ingredient, such as selecting avocado oil for a list of ingredients if the LLM notices a recipe will be roasting ingredients at above 425° F.—when other oils cannot be used.

In one or more embodiments, the task for the model serving system 150 is based on knowledge of the online system 140 that is fed to the machine-learning model of the model serving system 150, rather than relying on general knowledge encoded in the model weights of the model. Thus, one objective may be to perform various types of queries on the external data in order to perform any task that the machine-learning model of the model serving system 150 could perform. For example, the task may be to perform question-answering, text summarization, text generation, and the like based on information contained in an external dataset.

Thus, in one or more embodiments, the online system 140 is connected to an interface system 160. The interface system 160 receives external data from the online system 140 and builds a structured index over the external data using, for example, another machine-learned language model or heuristics. The interface system 160 receives one or more queries from the online system 140 on the external data. The interface system 160 constructs one or more prompts for input to the model serving system 150. A prompt may include the query of the user and context obtained from the structured index of the external data. In one instance, the context in the prompt includes portions of the structured indices as contextual information for the query. The interface system 160 obtains one or more responses from the model serving system 150 and synthesizes a response to the query on the external data. While the online system 140 can generate a prompt using the external data as context, often times, the amount of information in the external data exceeds prompt size limitations configured by the machine-learning language model. The interface system 160 can resolve prompt size limitations by generating a structured index of the data and offers data connectors to external data sources.

Figure 1B:
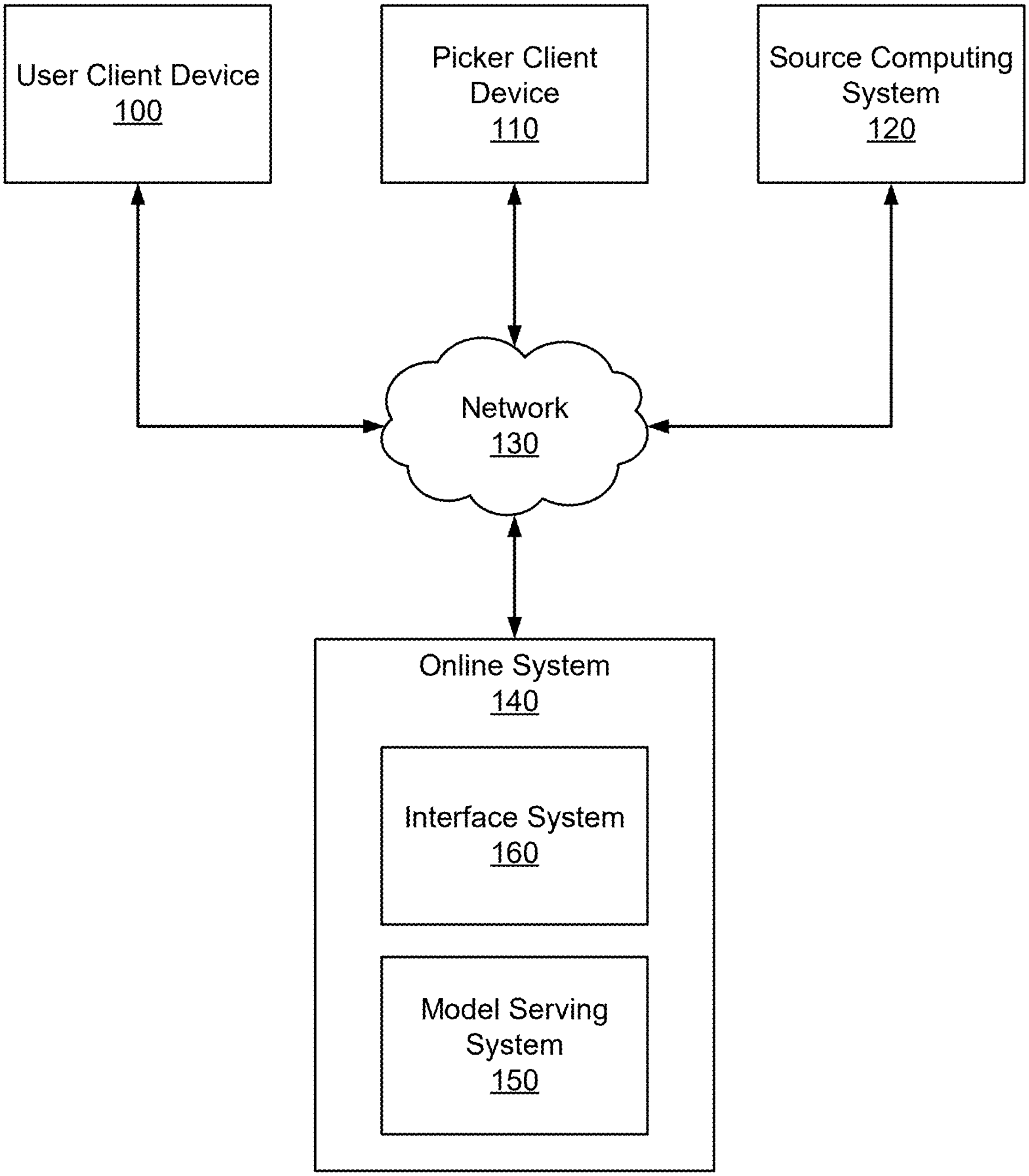
FIG. 1B illustrates an example system environment for an online system, in accordance with one or more embodiments.

FIG. 1B illustrates an example system environment for an online system 140, in accordance with one or more embodiments. The system environment illustrated in FIG. 1B includes a user client device 100, a picker client device 110, a source computing system 120, a network 130, and an online system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 is managed by a separate entity from the online system 140. In one or more embodiments, as illustrated in the example system environment in FIG. 1B, the model serving system 150 and/or the interface system 160 is managed and deployed by the entity managing the online system 140. The online system 140 is described in further detail below with regards to FIG. 2.

Figure 2:
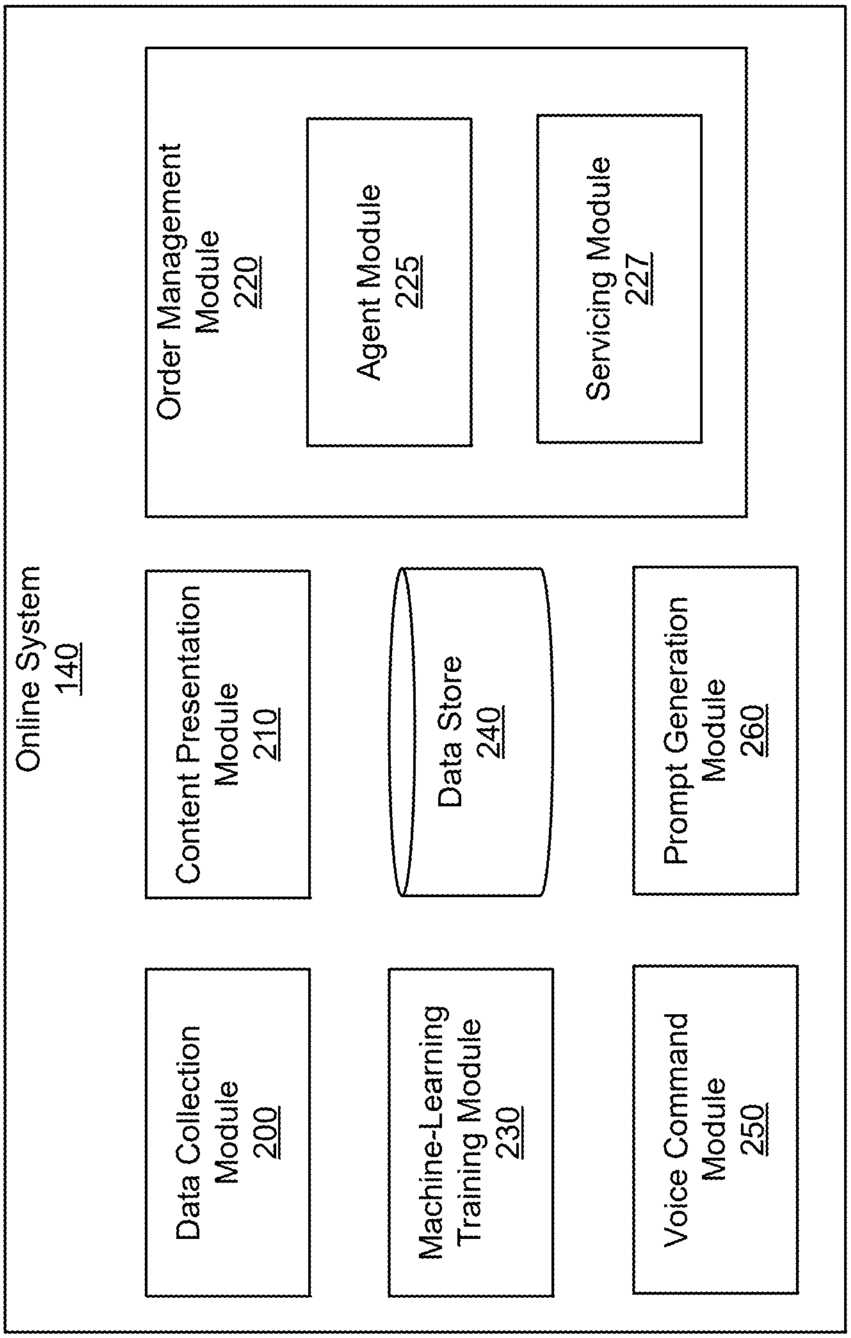
FIG. 2 illustrates an example system architecture for an online system, in accordance with one or more embodiments.

FIG. 2 illustrates an example system architecture for the online system 140, in accordance with some embodiments. The system architecture illustrated in FIG. 2 includes a data collection module 200, a content presentation module 210, an order management module 220, a machine-learning training module 230, a data store 240, a voice command module 250, and a prompt generation module 260. The order management module 220 may include an agent module 225 and a servicing module 227. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. In preferred embodiments, the data collection module 200 only collects data describing a user if the user has previously explicitly consented to the online system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default source/source location, payment instrument, delivery location, or delivery timeframe. The data collection module 200 may collect the user data from sensors on the user client device 100 or based on the user's interactions with the online system 140.

The data collection module 200 also collects item data, which is information or data that identifies and describes items that are available at a source location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in source locations. For example, for each item-source combination (a particular item at a particular warehouse), the item data may include a time that the item was last found, a time that the item was last not found (a picker looked for the item but could not find it), the rate at which the item is found, or the popularity of the item. The data collection module 200 may collect item data from the source computing system 120, the picker client device 110, or the user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a user rating for the picker, which sources the picker has collected items at, or the picker's previous shopping history. Additionally, the picker data may include preferences expressed by the picker, such as their preferred sources to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a user associated with the order, a source location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

While user data, picker data, source data, item data, and order data are described separately, data collected by the data collection module 200 may fall into more than one of these categories. For example, data describing a picker's performance for an order may be order data and picker data.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular source location. For example, the availability model may be trained to predict a likelihood that an item is available at a source location or may predict an estimated number of items that are available at a source location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from a user client device 100 and offers the orders to pickers for service based on picker data. For example, the order management module 220 offers an order to a picker based on the picker's location and the location of the source from which the ordered items are to be collected. The order management module 220 may also offer an order to a picker based on how many items are in the order, a vehicle operated by the picker, the delivery location, the picker's preferences on how far to travel to deliver an order, the picker's ratings by users, or how often a picker agrees to service an order.

In one or more embodiments, the order management module 220 determines when to offer an order to a picker based on a delivery timeframe requested by the user with the order. The order management module 220 computes an estimated amount of time that it would take for a picker to collect the items for an order and deliver the ordered items to the delivery location for the order. The order management module 220 offers the order to a picker at a time such that, if the picker immediately accepts and services the order, the picker is likely to deliver the order at a time within the requested timeframe. Thus, when the order management module 220 receives an order, the order management module 220 may delay offering the order to a picker if the requested timeframe is far enough in the future (i.e., the picker may be offered the order at a later time and is still predicted to meet the requested timeframe).

When the order management module 220 offers an order to a picker, the order management module 220 transmits the order to the picker client device 110 associated with the picker. The order management module 220 may also transmit navigation instructions from the picker's current location to the source location associated with the order. If the order includes items to collect from multiple source locations, the order management module 220 identifies the source locations to the picker and may also specify a sequence in which the picker should visit the source locations.

The order management module 220 may track the location of the picker through the picker client device 110 to determine when the picker arrives at the source location. When the picker arrives at the source location, the order management module 220 transmits the order to the picker client device 110 for display to the picker. As the picker uses the picker client device 110 to collect items at the source location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In one or more embodiments, the order management module 220 tracks the location of the picker within the source location. The order management module 220 uses sensor data from the picker client device 110 or from sensors in the source location to determine the location of the picker in the source location. The order management module 220 may transmit, to the picker client device 110, instructions to display a map of the source location indicating where in the source location the picker is located. Additionally, the order management module 220 may instruct the picker client device 110 to display the locations of items for the picker to collect, and may further display navigation instructions for how the picker can travel from their current location to the location of the next item to collect for an order.

The order management module 220 determines when the picker has collected the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the source location to the delivery location, or to a subsequent source location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In one or more embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes the total cost for the order and charges the user that cost. The order management module 220 may provide a portion of the total cost to the picker for servicing the order, and another portion of the total cost to the source.

The machine-learning training module 230 trains machine-learning models used by the online system 140. The online system 140 may use machine-learning models to perform functionalities described herein. Example machine-learning models include regression models, support vector machines, naïve Bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, transformers, large-language models, or multi-modal large language models. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from the input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In one or more embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

The data store 240 stores data used by the online system 140. For example, the data store 240 stores user data, item data, order data, and picker data for use by the online system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

With respect to the machine-learning models hosted by the model serving system 150, the machine-learning models may already be trained by a separate entity from the entity responsible for the online system 140. In one or more other embodiments, when the model serving system 150 is included in the online system 140, the machine-learning training module 230 may further train parameters of the machine-learning model based on data specific to the online system 140 stored in the data store 240. As an example, the machine-learning training module 230 may obtain a pre-trained transformer language model and further fine tune the parameters of the transformer language model using training data stored in the data store 240. The machine-learning training module 230 may provide the transformer language model to the model serving system 150 for deployment.

A user of the online system 140 starts building a shopping list, which could be manually built or by voice. Then, the user provides a voice prompt, such as to add ingredients (components or products) to the list, or to fill out ingredients. The voice command module 250 may receive voice commands from the user and perform speech to text translation to generate voice content in textual form for an LLM (e.g., LLM of the model serving system 150). The voice command module 250 may pass the voice content to the prompt generation module 260.

The prompt generation module 260 may generate a prompt for input into the LLM. In addition to the voice content from the voice command module 250, the prompt may further include contextual information. The voice prompts provided by the user may facilitate building metadata around the list of ingredients that is being generated. When including the contextual information to the prompt, the prompt generation module 260 may include information about user's sentiment (e.g., user's emotions), which may be extracted from the user's voice prompts, e.g., by applying a machine-learning model for sentiment extraction. Information about the user's sentiment may include information about the user's feelings related to different products. For example, the user's sentiment about an ingredient may be extracted based on a time period the user spent talking about a particular ingredient. If the user spent more time talking about a specific ingredient, it can be deduced that the user especially cares about that specific ingredient.

When including the contextual information to the prompt, the prompt generation module 260 may further include user data including information about user's conversion history, information about user's preferences, some other user's background and/or personalization data, or some combination thereof. The prompt generation module 260 may retrieve the user data from a user catalog database (e.g., stored at the data store 240). When including the contextual information to the prompt, the prompt generation module 260 may further include chat data including global chats between users of the online system 140 and pickers who fulfilled orders placed by the users. The prompt generation module 260 may retrieve the chat data from a chat catalog database (e.g., stored at the data store 240).

When including the contextual information to the prompt, the prompt generation module 260 may further include source data, such as item catalog data, information about availability of items at a specific source, information about a busyness of a specific source location, some other source related features, or some combination thereof. The prompt generation module 260 may retrieve the source data from an item catalog database (e.g., stored at the data store 240) and/or receive the source data from the source computing system 120 via the network 130.

An output generated by the LLM may include a list of ingredients (or components) and metadata about each ingredient on the list. An example specific output generated by the LLM for taco ingredients may be, e.g., ground beef—Canadian organic, 8 tacos, +20% fat; lettuce—organic, chopped, pre-washed, bagged. Attributes (e.g., size, form factor, quantity, etc.) and keywords about each ingredient that are part of the metadata may be deduced by the LLM during the conversation with the user through intent, prior purchase history, and sentiment analysis. Based on the output of the LLM, the content presentation module 210 may generate a user interface signal that is sent, via the network 130, to the user client device 100. The user interface signal may cause the user client device 100 to display a user interface with the list of ingredients and their metadata (e.g., attributes and/or keywords of the ingredients).

Based on further voice inputs from the user, the prompt for input into the LLM may be updated, and the LLM may generate an output with a modified list of ingredients and their metadata that is displayed at the user interface of the user client device 100. The user interface may also include visual indication of how the list of ingredients is being modified. In one or more embodiments, the agent module 225 generates responses to the user's voice inputs that are displayed at the user interface of the user client device 100. For example, the agent module 225 may respond to the user's voice inputs by asking for clarifying information about one or more ingredients in the list. This process is repeated back and forth between the user and the online system 140 that employs the LLM until the user is satisfied with the list of ingredients displayed at the user interface.

Once the user confirms the list of ingredients (e.g., via a user interface element of the user interface), the order management module 220 may convert (e.g., via the servicing module 227) the list of ingredients and the metadata for each ingredient into a list of items (e.g., brands), form factors, sizes, source, source location, delivery window, and/or one or more replacement items. The order management module 220 may utilize the item catalog database (e.g., at the data store 240) to convert the list of ingredients and their metadata to a list of items for conversion by the user. The content presentation module 210 may use the result of the order management module 220 to generate a user interface signal that is sent, via the network 130, to the user client device 100. The user interface signal may cause the user client device 100 to display a user interface with the list of items, where the items may be grouped at user interface first by delivery window, then by source location, then by item importance.

When the user provides the voice inputs, the user may speak out about their requirements and the LLM is taking in preferences for and against certain ingredients (i.e., components). The user may also use voice inputs to prompt the LLM to remove certain ingredients from the list, indicating a preference against certain replacements. For example, the user can use a voice input to ask about a recipe for bruschetta, and the LLM is recommending the ingredient "balsamic vinegar." Then, the user can say, "let's get a really nice aged balsamic vinegar, like maybe one from Italy or something," and the LLM updates the list with the "aged balsamic vinegar" ingredient. When the order management module 220 ultimately translates the "aged balsamic vinegar" ingredient into an item, a user's preferred source location may be out of stock for that item and a replacement is needed. In such cases, the order management module 220 has the knowledge that the user wants or prefers a premium imported aged balsamic vinegar for the automatic suggested replacement. Hence, voice metadata that are captured/translated by the LLM may be used by the online system 140 to enhance the semantic relevance in downstream Artificial Intelligence Markup Language (AIML) services/models, such as item replacements.

The servicing module 227 may generate one or more possible suggestions (e.g., source, source location, delivery time, conversion options, etc.) for the user to fulfill the list of items. In one or more embodiments, servicing module 227 prompts a second LLM (e.g., second LLM of the model serving system 150) with user's historical information and contextual information (e.g., item availability) to generate the one or more suggestions for fulfilment of the list of items. One of the outputs of the second LLM may be a source location that can be obtained by the second LLM leveraging available delivery windows, pickers' load, out-of-stock indicators, etc. The goal is to avoid burdening the user with various selections, and instead the online system 140 employs the second LLM to optimally select the preferred combination of source (or source location) and delivery time for each item on the list of items. The user may utilize a corresponding user interface element of the user interface at the user client device 100 to confirm one of the suggestion options generated by the second LLM for fulfilling the list of items. Alternatively, the user may utilize another user interface element of the user interface at the user client device 100 to select an option to save the list of items, so the user can shop the list of items manually, i.e., by going to the source location.

The LLM and the second LLM may be re-tuned (i.e., reinforced, or re-trained) using labels that were generated based on whether the suggestions to the user were good or bad. The suggestion may be labeled as good if the user accepted one of the orders and/or if the user manually shopped for the items suggested in one of the lists (e.g., as observed by the smart shopping cart). In contrast, the suggestion may be labeled as bad if the user does not accept the list of items, but then goes on to a search interface of the user client device 100 to build their own order manually.

The order management module 220 may compute various metrics representing measures of successful (or unsuccessful) generation of an order using voice prompts that can be used for generating labels for re-tuning the LLM (and, optionally, the second LLM), e.g., via the model serving system 150. One metric of the successful (or unsuccessful) order generation may be a largest and most specific order (e.g., combination of source, items, brands, delivery time, etc.) generated with the least amount of follow up voice prompts from the online system 140 and the LLM to the user. Another metric of the successful (or unsuccessful) order generation may be an amount of user's transactions from a generated list of items. For example, the metric value may increase if the user added all the items from the list to a cart and if the user performed the conversion (i.e., checkout) of the entire list of items. The order management module 220 may utilize transaction log (T-log) data for computing this metric if the user goes to a source location and uses an in-store mode conversion via an application of the online system 140 running on the user client device 100.

Another metric of the successful (or unsuccessful) order generation may be whether the user subsequently goes from the list building to a manual search of items. This means that the online system 140 and the LLM did not achieve everything that the user needed. This may be used as a label for negative reinforcement of the LLM. Another metric of the successful (or unsuccessful) order generation may be a value indicating globally what percentage of items are added to the cart via voice versus manual search. Another metric of the successful (or unsuccessful) order generation may be a fact that the user performs conversion at a source location X despite the online system 140 along with the LLM and the second LLM providing the list of items to be converted at a source location Y. The label generated using this metric may indicate that the second LLM did not provide the accurate source location for the previously generated list of items, and may be utilized for negative reinforcement of the second LLM.

The LLM (and, optionally, the second LLM) may be initially tuned (e.g., via the model serving system 150) using labels generated by including information about users' past purchase history, generalized users' data related to the branded items (e.g., products), users' historic replacement data, some other information about users' preferences, or some combination thereof. The model serving system 150 may generate the labels for initial tuning of the LLM (and, optionally, the second LLM) based on data retrieved from a user catalog database (e.g., stored at the data store 240).

The online system 140 employs the voice prompted LLM to build an order including a list of items and one or more sources for servicing the order that are preferable for a specific user of the online system 140. The online system 140 may also leverage enhancing a user interface of the user client device 100 by showing an image of an item that is tailored to the user's preferences deducted from the voice prompts. For example, if the user states: "I want green bananas," the voice prompted LLM may automatically mark the state of bananas item to "overripe," and the corresponding image of the "overripe bananas" may be automatically displayed at the user interface of the user client device 100.

Generating a user's preferred list of sources to deliver the list of items from is also a key facet of the voice prompted LLM. Users often have different preferences for sources for specific items. For example, Source A is a user's preference for obtaining Item A (e.g., blueberries), while Source B is a user's preference for obtaining Item B (e.g., chicken tenders). In such a case, the user may use voice prompts to specify they want Item A from Source A and Item B from Source B. This user's preference may be factored in and the second LLM may recommend fulfillment to be split up from Source A and Source B. However, the online system 140 along with the LLMs would be tuned so that if the user orders from Source B more frequently than from Source A, the agent module 225 may generate a prompt for the user and ask, e.g., "Do you need Item A sooner for your Recipe C? Maybe we should order Item A from Source B instead this time?"

The voice prompted LLM may be also fine-tuned to cleverly deduce a size augmentation, or form factor, with follow up prompts asked if necessary (e.g., generated via the agent module 225). For example, the user may use the voice prompt to ask: "I need enough ground beef to make six of these sandwiches from Recipe D which only serves four, can you provide enough for that in the order?" In such a case, the voice prompted LLM may generate a list of ingredients with an appropriate size, quantity, and/or form factor of each ingredient in the list.

As the voice prompted LLM garners user's intent from the user's voice prompts, as well as emotions within the voice prompts, the online system 140 enhances the list building user interface. The online system 140 may place (e.g., via the content presentation module 210) at the user interface of the user client device 100 specific visual signs (e.g., emojis) next to certain items that are deducted by the LLM as important for the user. For example, if the user states that "It's really important I get Brand D chicken," the content presentation module 210 may generate a user interface signal that causes the user client device 100 to generate the user interface with a star next to the item "Brand D chicken" in the list of items. This may subsequently be used to mark this particular item as a foundational cart item and forward the information to a picker who is servicing an order to be extra certain about getting this particular item.

As aforementioned, identifying a user's preferred list of sources to deliver from the list of items is very important. The online system 140 and the voice prompted LLM may curate the list building user interface at the user client device 100 to separate each source into a separate section of the list with potentially separate delivery times. The online system 140 may utilize the output from the voice prompted LLM to make (e.g., via the content presentation module 210) the user interface intuitive to allow easy switch between sources, e.g., if a portion of the list serviced by a specific source is not going to get delivered in time. For example, based on the output from the voice prompted LLM, the content presentation module 210 may generate a user interface signal causing the user client device 100 to display a user interface with different source icons next to different items in the list to show that certain items are in the "Source A list" and that other items are in the "Source B list".

It should be noted that information about the user's intent and preferences inferred by the voice prompted LLM may be fed (e.g., via the order management module 220 and/or the content presentation module 210) into different downstream areas having use cases visualized at the user interface of the user client device 100. Hence, the user interface enhancement facilitated by the voice prompted LLM does not need to be related to a list of items displayed at the user interface.

As the voice prompted LLM provides accurate and detailed contextual information about the user's current shopping session, the online system 140 may improve the ads that are shown to the user during the shopping session. Given that the voice prompted LLM generates a substantial amount of specific metadata around items on the list the user is building, the online system 140 may allow for specific ads to be shown on subsequent views on the user interface of the user client device, in-store, or on a user interface of the smart shopping cart. For example, if the user uses voice prompts to stress a desire for "high quality" or "premium" olive-oil, then the online system 140 may only show (e.g., via the content presentation module 210) ads for premium olive oils, and possibly for spin up offers in real-time for this type of items. The content presentation module 210 may further utilize the metadata to influence ads outside the specific items on the list. For example, if the user wants premium olive oils, the user may also want premium salad dressings offered to the user.

In addition to ad targeting, the content presentation module 210 may use the metadata generated by the voice prompted LLM for ranking of items that are displayed at the user interface of the user client device 100. Based on the metadata, the content presentation module 210 may generate a user interface signal causing the user client device 100 to display a user interface with those items for which the voice prompted LLM infers to be important (or foundational items) ranked higher than other items for which the voice prompted LLM infers not to be that important items.

Figure 3:
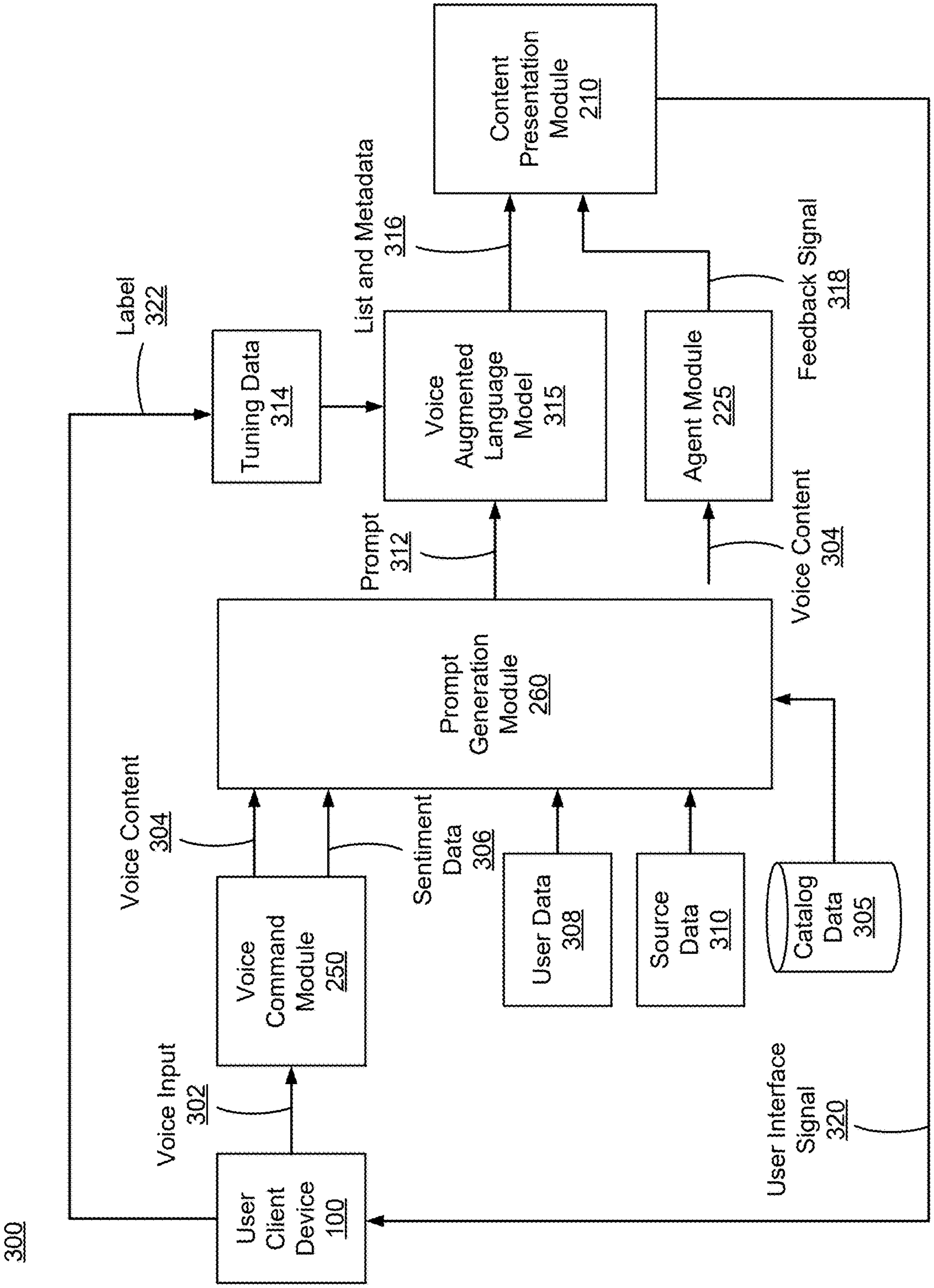
FIG. 3 illustrates an example architectural flow diagram of using a voice augmented language model to create a list of components personalized for a specific user of an online system, in accordance with one or more embodiments.

FIG. 3 illustrates an example architectural flow diagram 300 of using a voice augmented language model 315 (e.g., LLM of the model serving system 150, or generative artificial intelligence model) to create a list of components (e.g., ingredients) personalized for a specific user of the online system 140, in accordance with one or more embodiments. The user may utilize the user client device 100 to provide a voice input 302 in relation to building a shopping list (i.e., list of items for conversion). The voice command module 250 may use the voice input 302 to generate voice content 304 in a textual form, as well as to extract sentiment data 306 that includes an indication of how much the user care about specific components in the list (e.g., information about user's emotions in relation to specific components). The sentiment data 306 may also include information about a time duration the user talked about one or more components for inclusion into the list. The voice command module 250 may pass the voice content 304 and the sentiment data 306 to the prompt generation module 260.

The prompt generation module 260 may generate a prompt 312 for input into the voice augmented language model 315, the prompt 312 including the voice content 304 and the sentiment data 306. The prompt 312 may further include user data 308, source data 310, catalog data 305, some additional data, or some combination thereof. In including the user data 308 to the prompt 312, the prompt generation module 260 may include information about conversion history for the user, information about conversion preferences for the user, some other user related data retrieved from a user catalog database (e.g., stored at the data store 240), or some combination thereof. In including the source data 310 to the prompt 312, the prompt generation module 260 may include information about availability of a specific set of items at a source, information about a busyness of one or more specific locations of the source, some other source related data, or some combination thereof. The prompt generation module 260 may receive the source data 310 from the source computing system 120 via the network 130. The prompt generation module 260 may further retrieve the catalog data 305 (e.g., from the data store 240), where the catalog data 305 may include information about one or more recipes, information about specific ingredients and/or items from the voice content 304, some other item related data, or some combination thereof. The prompt generation module 260 may pass the prompt to the voice augmented language model 315.

The voice augmented language model 315 may generate, based on the prompt 312, a list and metadata 316 (i.e., response) that includes a list of components (e.g., list of ingredients) and metadata (one or more attributes and/or keywords) for each component in the list. The voice augmented language model 315 may pass the list and metadata 316 to the content presentation module 210. The content presentation module 210 may use the list and metadata 316 to generate a user interface signal 320 that is then sent (e.g., via the network 130) to the user client device 100. The user interface signal 320 may cause the user client device 100 to display a user interface with the list and metadata 316, i.e., with the list of components and the metadata for each component. The user may then view the list and metadata 316 and provide an additional voice input 302. Alternatively, the user may utilize a user interface element of the user interface to accept the list and metadata 316, which then triggers the order management module 220 to generate, using the list and metadata 316, a list of items for conversion by the user and one or more options for conversion (e.g., one or more sources, one or more delivery time windows, etc.).

In one or more embodiments, the agent module 225 may utilize the voice content 304 to generate a feedback signal 318 that includes a request for the user to provide additional information in relation to one or more components (e.g., ingredients) mentioned in the voice content. The agent module 225 may pass the feedback signal 318 to the content presentation module 210. The content presentation module 210 may use the feedback signal 318 (e.g., in addition to the list and metadata 316) to generate the user interface signal 320 that causes the user client device 100 to display the user interface with the request for the user to provide the additional information. In response to the request displayed at the user interface, the user may provide the additional voice input 302.

The user client device 100 may record an indication that the user accepted the list and metadata 316 displayed at the user interface, and optionally an indication that the user accepted one specific option for servicing an order that includes the list of items generated using the list and metadata 316. Alternatively, the user client device 100 may record an indication that the user did not accept the list and metadata 316 displayed at the user interface, and optionally an indication that the user did not accept any option for servicing an order that includes the list of items generated using the list and metadata 316. The recorded indication(s) may be included into a label 322 that is then included into tuning data 314. The model serving system 150 may utilize the tuning data 314 including the label 322 for retuning the voice augmented language model 315.

Figure 4:
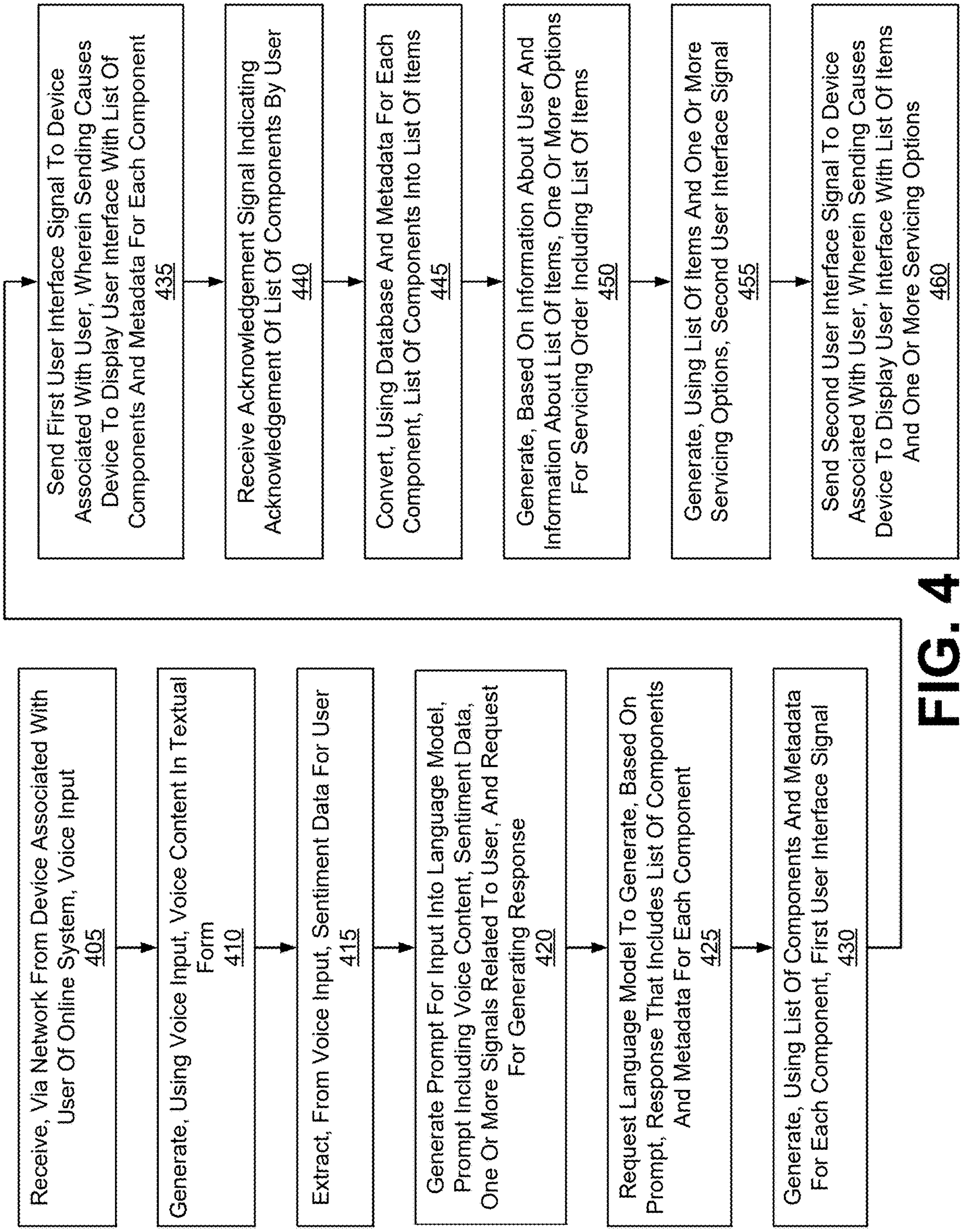
FIG. 4 is a flowchart for a method of using a voice augmented language model to create a personalized order for servicing by an online system, in accordance with one or more embodiments.

FIG. 4 is a flowchart for a method of using a voice augmented language model to create a personalized order for servicing by an online system, in accordance with one or more embodiments. Alternative embodiments may include more, fewer, or different steps from those illustrated in FIG. 4, and the steps may be performed in a different order from that illustrated in FIG. 4. These steps may be performed by an online system (e.g., the online system 140). Additionally, each of these steps may be performed automatically by the online system without human intervention.

The online system 140 receives 405 (e.g., at the voice command module 250), via a network (e.g., the network 130) from a device associated with a user of the online system 140 (e.g., the user client device 100), a voice input. The online system 140 generates 410 (e.g., via the voice command module 250), using the voice input, voice content in a textual form. The online system 140 extracts 415 (e.g., via the voice command module 250), from the voice input, sentiment data for the user.

The online system 140 generates 420 (e.g., via the prompt generation module 260) a prompt for input into a language model (e.g., LLM of the model serving system 150, or the voice augmented language model 315), the prompt including the voice content, the sentiment data, one or more signals related to the user, and a request for generating a response that includes a list of components (e.g., list of ingredients) and metadata (e.g., one or more attributes and/or one or more keywords) for each component in the list of components. The online system 140 requests 425 (e.g., via the prompt generation module 260) the language model to generate, based on the prompt input into the language model, the response that includes the list of components and the metadata for each component.

The online system 140 may retrieve (e.g., via the prompt generation module 260), from a database of the online system 140 (e.g., the data store 240), user data including at least one of information about conversion history for the user or information about conversion preferences for the user. The online system 140 may derive (e.g., via the prompt generation module 260), using the retrieved user data, the one or more signals related to the user.

The online system 140 may extract (e.g., via the voice command module 250), from the voice input, information about a time duration the user talked about a component for inclusion into the list of components. The online system 140 may include (e.g., via the prompt generation module 260) the information about the time duration into the prompt for input into the language model.

The online system 140 may retrieve (e.g., via the prompt generation module 260), from the database, chat data including information about communications between a set of users of the online system 140 and a set of agents who serviced orders placed by the set of users. The online system 140 may include (e.g., via the prompt generation module 260) the chat data into the prompt for input into the language model.

The online system 140 may receive (e.g., at the prompt generation module 260), from a device associated with a source (e.g., the source computing system 120) and via the network, source data including at least one of information about availability of a set of items at the source or information about a busyness of a location of the source. The online system 140 may include (e.g., via the prompt generation module 260) the source data into the prompt for input into the language model.

The online system 140 generates 430 (e.g., via the content presentation module 210), using the list of components and the metadata for each component, a first user interface signal. The online system 140 sends 435 (e.g., via the content presentation module 210), via the network, the first user interface signal to the device associated with the user, wherein the sending the first user interface signal causes the device associated with the user to display a user interface with the list of components and the metadata for each component.

The online system 140 receives 440 (e.g., at the order management module 220), from the device associated with the user and via the network, an acknowledgement signal indicating an acknowledgement of the list of components by the user. Responsive to receiving the acknowledgement signal, the online system 140 converts 445 (e.g., via the order management module 220), based at least in part on information about items in the database and the metadata for each component, the list of components into a list of items for conversion by the user.

The online system 140 may receive (e.g., at the order management module 220), from a device associated with a source (e.g., the source computing system 120) and via the network, an unavailability signal indicating that an item corresponding to a component from the list of components is unavailable at the source. Responsive to receiving the unavailability signal, the online system 140 may identify (e.g., via the order management module 220), based at least in part on the information about items in the database and the extracted sentiment data, a replacement item for replacing the item in the list of items.

The online system 140 generates 450 (e.g., via the order management module 220 and/or the prompt generation module 260), based at least in part on information about the user and information about the list of items, one or more options for servicing an order including the list of items. The online system 140 generates 455 (e.g., via the content presentation module 210), using the list of items and the one or more options for servicing the order, a second user interface signal. The online system 140 sends 460 (e.g., via the content presentation module 210), via the network, the second user interface signal to the device associated with the user, wherein the sending the second user interface signal causes the device associated with the user to display the user interface with the list of items and the one or more options for servicing the order.

The online system 140 may retrieve (e.g., via the prompt generation module 260), from the database, user data including at least one of information about conversion history for the user or information about conversion preferences for the user. The online system 140 may receive (e.g., at the prompt generation module 260), from a device associated with a source (e.g., the source computing system 120) and via the network, source data including at least one of information about availability of items from the list of items at the source or information about a busyness of a location of the source. The online system 140 may generate (e.g., via the prompt generation module 260) a second prompt for input into a second language model (e.g., LLM of the model serving system 150), the second prompt including the user data, the source data, and the voice content (e.g., user's preference about a specific source for one or more specific items as provided in the voice input). The online system 140 may request (e.g., via the prompt generation module 260) the second language model to generate, based on the second prompt input into the second language model, a second response that includes the one or more options for servicing the order.

The online system 140 may receive (e.g., at the voice command module 250), via the network from the device associated with the user, a second voice input. The online system 140 may generate (e.g., via the voice command module 250), using the second voice input, second voice content in the textual form. The online system 140 may extract (e.g., via the voice command module 250), from the second voice input, updated sentiment data for the user. The online system 140 may generate (e.g., via the prompt generation module 260) a second prompt for input into the language model, the second prompt including the second voice content and the updated sentiment data. The online system 140 may request (e.g., via the prompt generation module 260) the language model to generate, based on the second prompt input into the language model, a second response that includes an updated version of the list of components and metadata for each component in the updated version of the list. The online system 140 may generate (e.g., via the content presentation module 210), using the updated version of the list and the metadata for each component in the updated version of the list, a third user interface signal. The online system 140 may send (e.g., via the content presentation module 210), via the network, the third user interface signal to the device associated with the user, wherein the sending the third user interface signal causes the device associated with the user to display the user interface with a visual indication of how the list of components is being updated.

The online system 140 may generate (e.g., via the agent module 225), using the voice content, a response signal including a request for the user to provide additional information in relation to one or more components in the list of components. The online system 140 may generate (e.g., via the content presentation module 210), using the response signal, a fourth user interface signal. The online system 140 may send (e.g., via the content presentation module 210), via the network, the fourth user interface signal to the device associated with the user, wherein the sending the fourth user interface signal causes the device associated with the user to display the user interface with the request for the user to provide the additional information. The user may then provide the second voice input in response to the request.

The online system 140 may generate (e.g., via the machine-learning training module 230) a label for tuning data, the label including an indication that the user accepted the one or more options for servicing the order. The online system 140 may retune the language model (e.g., via the machine-learning training module 230 or the model serving system 150) using the tuning data including the label.

The online system 140 may receive (e.g., at the machine-learning training module 230), from the device associated the user (e.g., the user client device 100 or the smart shopping cart) and via the network, conversion data including information that the user converted on the list of items in a source location. The online system 140 may generate (e.g., via the machine-learning training module 230) a label for tuning data, the label including an indication about the conversion data. The online system 140 may retune the language model (e.g., via the machine-learning training module 230 or the model serving system 150) using the tuning data including the label.

The online system 140 may receive (e.g., at the machine-learning training module 230), from the device associated with the user and via the network, a negative acknowledgement signal indicating the user did not accept the list of components or the one or more options for servicing the order. The online system 140 may receive (e.g., at the machine-learning training module 230), from the device associated with the user and via the network, a searching signal indicating the user used a search interface of the device associated with the user to search for a set of items. Responsive to receiving the negative acknowledgement signal and the searching signal, the online system 140 may generate (e.g., via the machine-learning training module 230) a label for tuning data, the label including an indication that the user did not accept the order. The online system 140 may retune the language model (e.g., via the machine-learning training module 230 or the model serving system 150) using the tuning data including the label.

Embodiments of the present disclosure are directed to the online system 140 that uses a voice augmented language model (e.g., LLM of the model serving system 150) to create an order for servicing by the online system 140. The online system 140 presented herein allows for a user's voice conversation with the language model, while providing various contextual data to the prompts for input into the language model. An output of the language model when accepted by the user may be then provided to a fulfillment part of the online system 140. When compared to other methods of receiving user's inputs, voice inputs provide much more contextual information about the user's intent, which is utilized by the language model and the online system 140 to build an order that is preferable by the user.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A method, performed at a computer system comprising a processor and a computer-readable medium, comprising:

receiving, via a network and at a voice command module of the computer system, a voice input transmitted to the computer system from a device associated with a user of the computer system;

generating, using the voice input and by the voice command module, voice content in a textual form;

extracting sentiment data for the user by a trained machine-learning model for sentiment extraction of the voice command module that is applied to the voice input, the sentiment data including information about one or more emotions of the user in relation to one or more components;

generating a prompt for input into a language model, the prompt including the voice content, the sentiment data, one or more signals related to the user, and a request for generating a response that includes a list of components including the one or more components and metadata for each component in the list of components;

requesting the language model to generate, using the prompt input into the language model, the response that includes the list of components and the metadata for each component;

generating, using the list of components and the metadata for each component, a first user interface signal;

sending, via the network, the first user interface signal to the device associated with the user, wherein sending the first user interface signal causes the device associated with the user to display a user interface with the list of components and the metadata for each component;

receiving, from the device associated with the user and via the network, an acknowledgement signal indicating an acknowledgement of the list of components by the user;

responsive to receiving the acknowledgement signal, converting, using information about items in a database of the computer system and the metadata for each component, the list of components into a list of items for conversion by the user;

generating, using information about the user and information about the list of items, one or more options for servicing an order including the list of items;

generating, using the list of items and the one or more options for servicing the order, a second user interface signal; and sending, via the network, the second user interface signal to the device associated with the user, wherein sending the second user interface signal causes the device associated with the user to display the user interface with the list of items and the one or more options for servicing the order.

2. The method of claim 1, further comprising:

receiving, via the network and from the device associated with the user, a second voice input;

generating, using the second voice input, second voice content in the textual form;

extracting, from the second voice input, updated sentiment data for the user;

generating a second prompt for input into the language model, the second prompt including the second voice content and the updated sentiment data;

requesting the language model to generate, using the second prompt input into the language model, a second response that includes an updated version of the list of components and metadata for each component in the updated version of the list;

generating, using the updated version of the list and the metadata for each component in the updated version of the list, a third user interface signal; and sending, via the network, the third user interface signal to the device associated with the user, wherein sending the third user interface signal causes the device associated with the user to display the user interface with a visual indication of how the list of components is being updated.

3. The method of claim 2, further comprising:

generating, using the voice content, a response signal including a request for the user to provide additional information in relation to one or more components in the list of components;

generating, using the response signal, a fourth user interface signal; and sending, via the network, the fourth user interface signal to the device associated with the user, wherein sending the fourth user interface signal causes the device associated with the user to display the user interface with the request for the user to provide the additional information, wherein the second voice input is provided by the user in response to the request.

4. The method of claim 1, further comprising:

retrieving, from the database, user data including at least one of information about conversion history for the user or information about conversion preferences for the user; and deriving, using the retrieved user data, the one or more signals related to the user.

5. The method of claim 1, wherein generating the prompt further comprises:

extracting, from the voice input, information about a time duration the user talked about a component for inclusion into the list of components; and including the information about the time duration into the prompt for input into the language model.

6. The method of claim 1, wherein generating the prompt further comprises:

retrieving, from the database, chat data including information about communications between a set of users of the computer system and a set of agents who serviced orders placed by the set of users; and including the chat data into the prompt for input into the language model.

7. The method of claim 1, wherein generating the prompt further comprises:

receiving, from a device associated with a source and via the network, source data including at least one of information about availability of a set of items at the source or information about a busyness of a location of the source; and including the source data into the prompt for input into the language model.

8. The method of claim 1, wherein converting the list of components into the list of items comprises:

receiving, from a device associated with a source and via the network, an unavailability signal indicating that an item corresponding to a component from the list of components is unavailable at the source; and responsive to receiving the unavailability signal, identifying, using the information about items in the database and the extracted sentiment data, a replacement item for replacing the item in the list of items.

9. The method of claim 1, wherein generating the one or more options for servicing the order comprises:

retrieving, from the database, user data including at least one of information about conversion history for the user or information about conversion preferences for the user;

receiving, from a device associated with a source and via the network, source data including at least one of information about availability of items from the list of items at the source or information about a busyness of a location of the source;

generating a second prompt for input into a second language model, the second prompt including the user data, the source data, and the voice content; and requesting the second language model to generate, using the second prompt input into the second language model, a second response that includes the one or more options for servicing the order.

10. The method of claim 1, further comprising:

generating a label for tuning data, the label including an indication that the user accepted the one or more options for servicing the order; and retuning the language model using the tuning data including the label.

11. The method of claim 1, further comprising:

receiving, from the device associated the user and via the network, conversion data including information that the user converted on the list of items in a source location;

generating a label for tuning data, the label including an indication about the conversion data; and retuning the language model using the tuning data including the label.

12. The method of claim 1, further comprising:

receiving, from the device associated with the user and via the network, a negative acknowledgement signal indicating the user did not accept the list of components or the one or more options for servicing the order;

receiving, from the device associated with the user and via the network, a searching signal indicating the user used a search interface of the device associated with the user to search for a set of items;

responsive to receiving the negative acknowledgement signal and the searching signal, generating a label for tuning data, the label including an indication that the user did not accept the order; and retuning the language model using the tuning data including the label.

13. A computer program product comprising a non-transitory computer readable storage medium having instructions encoded thereon that, when executed by a processor, cause the processor to perform steps comprising:

receiving, via a network and at a voice command module of a computer system, a voice input transmitted to the computer system from a device associated with a user of the computer system;

generating, using the voice input and by the voice command module, voice content in a textual form;

extracting sentiment data for the user by a trained machine-learning model for sentiment extraction of the voice command module that is applied to the voice input, the sentiment data including information about one or more emotions of the user in relation to one or more components;

generating a prompt for input into a language model, the prompt including the voice content, the sentiment data, one or more signals related to the user, and a request for generating a response that includes a list of components including the one or more components and metadata for each component in the list of components;

requesting the language model to generate, using the prompt input into the language model, the response that includes the list of components and the metadata for each component;

generating, using the list of components and the metadata for each component, a first user interface signal;

sending, via the network, the first user interface signal to the device associated with the user, wherein sending the first user interface signal causes the device associated with the user to display a user interface with the list of components and the metadata for each component;

receiving, from the device associated with the user and via the network, an acknowledgement signal indicating an acknowledgement of the list of components by the user;

responsive to receiving the acknowledgement signal, converting, using information about items in a database of the computer system and the metadata for each component, the list of components into a list of items for conversion by the user;

generating, using information about the user and information about the list of items, one or more options for servicing an order including the list of items;

generating, using the list of items and the one or more options for servicing the order, a second user interface signal; and sending, via the network, the second user interface signal to the device associated with the user, wherein sending the second user interface signal causes the device associated with the user to display the user interface with the list of items and the one or more options for servicing the order.

14. The computer program product of claim 13, wherein the instructions further cause the processor to perform steps comprising:

receiving, via the network from the device associated with the user, a second voice input;

generating, using the second voice input, second voice content in the textual form;

extracting, from the second voice input, updated sentiment data for the user;

generating a second prompt for input into the language model, the second prompt including the second voice content and the updated sentiment data;

requesting the language model to generate, using the second prompt input into the language model, a second response that includes an updated version of the list of components and metadata for each component in the updated version of the list;

generating, using the updated version of the list and the metadata for each component in the updated version of the list, a third user interface signal; and sending, via the network, the third user interface signal to the device associated with the user, wherein sending the third user interface signal causes the device associated with the user to display the user interface with a visual indication of how the list of components is being updated.

15. The computer program product of claim 14, wherein the instructions further cause the processor to perform steps comprising:

generating, using the voice content, a response signal including a request for the user to provide additional information in relation to one or more components in the list of components;

generating, using the response signal, a fourth user interface signal; and sending, via the network, the fourth user interface signal to the device associated with the user, wherein sending the fourth user interface signal causes the device associated with the user to display the user interface with the request for the user to provide the additional information, wherein the second voice input is provided by the user in response to the request.

16. The computer program product of claim 13, wherein the instructions further cause the processor to perform steps comprising:

extracting, from the voice input, information about a time duration the user talked about a component for inclusion into the list of components; and including the information about the time duration into the prompt for input into the language model.

17. The computer program product of claim 13, wherein the instructions further cause the processor to perform steps comprising:

receiving, from a device associated with a source and via the network, an unavailability signal indicating that an item corresponding to a component from the list of components is unavailable at the source; and responsive to receiving the unavailability signal, identifying, using the information about items in the database and the extracted sentiment data, a replacement item for replacing the item in the list of items.

18. The computer program product of claim 13, wherein the instructions further cause the processor to perform steps comprising:

retrieving, from the database, user data including at least one of information about conversion history for the user or information about conversion preferences for the user;

receiving, from a device associated with a source and via the network, source data including at least one of information about availability of items from the list of items at the source or information about a busyness of a location of the source;

generating a second prompt for input into a second language model, the second prompt including the user data, the source data, and the voice content; and requesting the second language model to generate, using the second prompt input into the second language model, a second response that includes the one or more options for servicing the order.

19. The computer program product of claim 13, wherein the instructions further cause the processor to perform steps comprising:

receiving, from the device associated the user and via the network, conversion data including information that the user converted on the list of items in a source location;

generating a label for tuning data, the label including an indication about the conversion data; and retuning the language model using the tuning data including the label.

20. A computer system comprising:

a processor; and a non-transitory computer-readable storage medium having instructions that, when executed by the processor, cause the computer system to perform steps comprising:

receiving, via a network and at a voice command module of the computer system, a voice input transmitted to the computer system from a device associated with a user of the computer system;

generating, using the voice input and by the voice command module, voice content in a textual form;

extracting sentiment data for the user by a trained machine-learning model for sentiment extraction of the voice command module that is applied to the voice input, the sentiment data including information about one or more emotions of the user in relation to one or more components;

generating a prompt for input into a language model, the prompt including the voice content, the sentiment data, one or more signals related to the user, and a request for generating a response that includes a list of components including the one or more components and metadata for each component in the list of components;

requesting the language model to generate, using the prompt input into the language model, the response that includes the list of components and the metadata for each component;

generating, using the list of components and the metadata for each component, a first user interface signal;

sending, via the network, the first user interface signal to the device associated with the user, wherein sending the first user interface signal causes the device associated with the user to display a user interface with the list of components and the metadata for each component;

receiving, from the device associated with the user and via the network, an acknowledgement signal indicating an acknowledgement of the list of components by the user;

responsive to receiving the acknowledgement signal, converting, using information about items in a database of the computer system and the metadata for each component, the list of components into a list of items for conversion by the user;

generating, using information about the user and information about the list of items, one or more options for servicing an order including the list of items;

generating, using the list of items and the one or more options for servicing the order, a second user interface signal; and sending, via the network, the second user interface signal to the device associated with the user, wherein sending the second user interface signal causes the device associated with the user to display the user interface with the list of items and the one or more options for servicing the order.

* * * * *